United States Patent
Tang et al.

(10) Patent No.: US 7,081,840 B2
(45) Date of Patent: Jul. 25, 2006

(54) DECODER FOR DECODING SYMMETRIC/ASYMMETRIC DELAY MODULATION SIGNAL AND THE METHOD THEREOF

(75) Inventors: Cheng-Ming Tang, Hsinchu (TW); Wen-Tsai Liao, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 10/986,086

(22) Filed: Nov. 12, 2004

(65) Prior Publication Data

US 2005/0117668 A1   Jun. 2, 2005

(30) Foreign Application Priority Data

Nov. 28, 2003   (TW) .............................. 92133567 A

(51) Int. Cl.
*H03M 1/10*   (2006.01)
(52) U.S. Cl. ...................................... 341/120
(58) Field of Classification Search ................. 327/38, 327/18, 26, 27, 31, 34, 551, 141, 20; 377/69; 341/120, 106
See application file for complete search history.

(56) References Cited

U.S. PATENT DOCUMENTS 4,313,174 A * 1/1982 White .......................... 708/606
5,923,191 A * 7/1999 Nemetz et al. ................ 327/20

* cited by examiner

Primary Examiner—Brian Young
(74) Attorney, Agent, or Firm—Troxell Law Office, PLLC

(57) ABSTRACT

The invention relates to a decoder for decoding a received signal to obtain a corresponding decoded bit series. The signal comprises a plurality of pulses. The decoder comprises a memory, a counting module, a transform module, and a logic module. The memory is for storing a predetermined look-up table; the look-up table comprises plural kinds of edge time duties and the corresponding decoded bit combinations thereof. The counting module is for measuring the edge time duty between high edges and low edges of adjacent pulses of the signal, so as to obtain a first and a second time series. The transform module, according to the look-up table, is for translating the first time series to a first decoded series, and the second time series to a second decoded series. The logic module is for performing a corresponding logic operation on the first and the second decoded series, so as to obtain the decoded bit series.

19 Claims, 6 Drawing Sheets

| Time Duty | Last Bit 0 | Last Bit 1 |
|---|---|---|
| 8T/9T | Header + Start 0/1 ||
| <=3T | Violate Rule ||
| 4T | 00 | 11 |
| 5T | 0X1 | X0 |
| 6T | 010 | XX1 |
| 7T | 0101 | 010 |
| 8T | Violate Rule | 0101 |
| >8T & not Header Start | Violate Rule ||

FIG. 2A

| Time Duty | Combination | Last Bit 0 | Last Bit 1 |
|---|---|---|---|
| 8T/9T | 6T+2T/6T+3T | Header + Start 0/1 | |
| =< 3T | Violate Rule | | |
| 4T | 2T+2T | 00 | 11 |
| 5T | 2T+3T | 001 | 10 |
| | 3T+2T | 011 | 00 |
| | | 0X1 | X0 |
| 6T | 3T+3T | 010 | 001 |
| | 4T+2T | No Case | 011 |
| | 2T+4T | No Case | 101 |
| | | 010 | XX1 |
| 7T | 3T+4T | 0101 | No Case |
| | 4T+3T | No Case | 010 |
| | | 0101 | 010 |
| 8T | 4T+4T | Violate Rule | 0101 |
| > 8T & not header start | Violate Rule | | |

FIG. 2B

DECODER FOR DECODING SYMMETRIC/ASYMMETRIC DELAY MODULATION SIGNAL AND THE METHOD THEREOF

BACKGROUND OF THE INVENTION

1. Field of the Invention

The present invention relates to a decoding apparatus and method; more particularly, to a decoding apparatus and method for decoding by the edge time duties between the high and low edges of a signal.

2. Description of the Prior Art

In the decoders for decoding conventional delay modulation signals, the signal decoding method is to sample by 4×frequency (T/4) for recovering the data signals; because of noise interference, signal weakness, or level mis-determination of a hardware receiver, a normal signal always turns into an asymmetric signal. The conventional decoding method for decoding an asymmetric signal is to measure the width of a signal, and to perform the signal compensating calculation. However, this method increases the computing difficulties and measuring time, and it may still be unable to decode the signals.

SUMMARY OF THE INVENTION

The main objective of the present invention is to provide a decoding apparatus and method for solving the above-mentioned problems.

Another objective of the present invention is to provide a decoding apparatus and method for decreasing the computing difficulties and shortening the necessary measuring time for decoding.

The decoding method of the present invention comprises a look-up table. The look-up table comprises plural kinds of edge time duties and the corresponding decoded bit combinations. The present invention is to measure the high edge time duty between high edges of the adjacent pulses of the signal sequentially for obtaining a first time series, and then to measure the low edge time duty between low edges of the adjacent pulses of the signal sequentially for obtaining a second time series. Next, according to the look-up table, the first and second time series are translated into a first and second decoded series respectively. Next, the invention performs a corresponding logic OR operation to the bit of the first and second decoded series; finally, the decoded bit series is obtained.

The advantage and spirit of the invention may be understood by the following recitations together with the appended drawings.

BRIEF DESCRIPTION OF THE APPENDED DRAWINGS

FIG. 2A and FIG. 2B are look-up tables of the decoding method of the present invention.

DETAILED DESCRIPTION OF THE INVENTION

Figure 1:
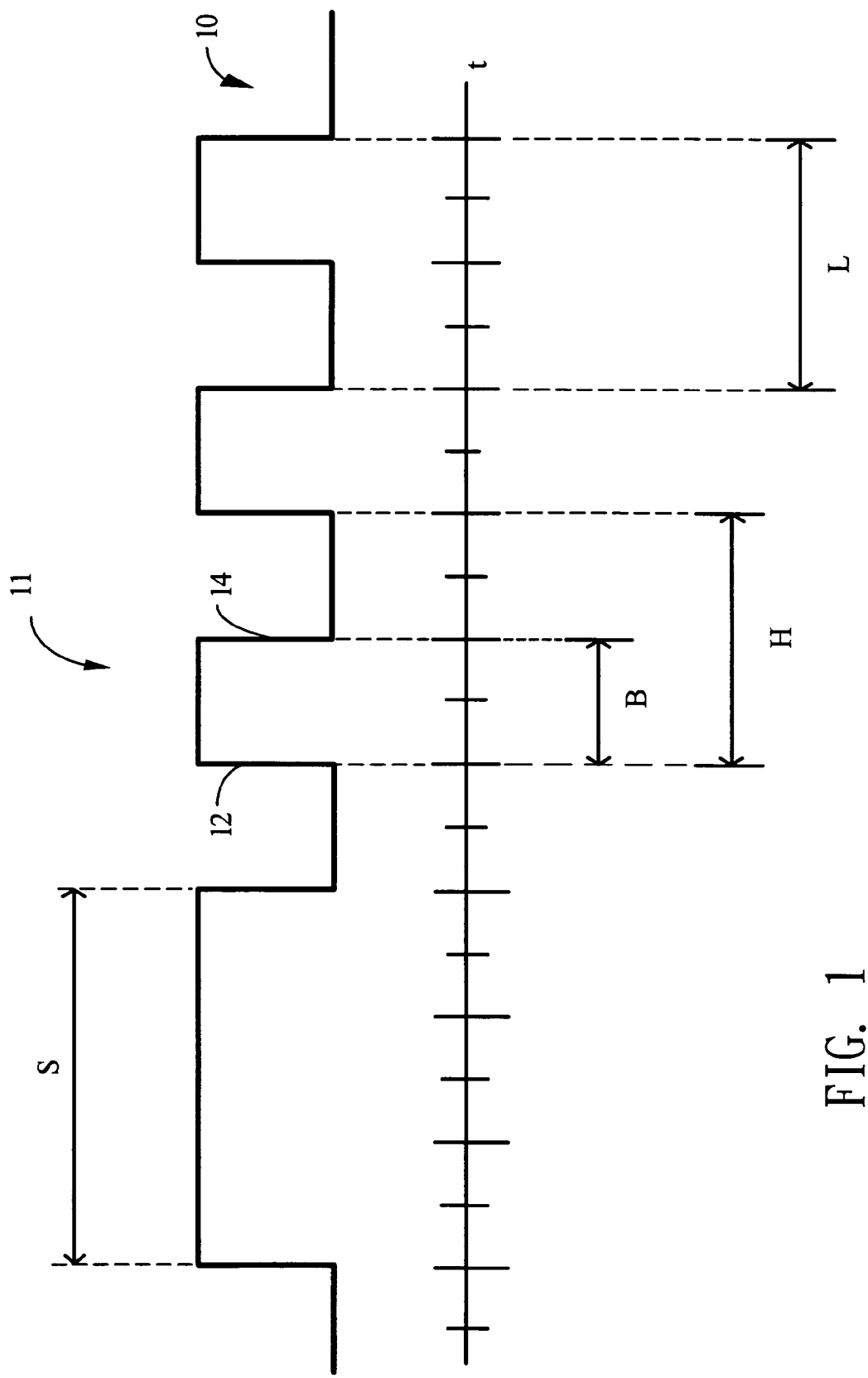
FIG. 1 is a schematic diagram of the decoding method of the present invention.

Referring to FIG. 1, FIG. 1 is a schematic diagram showing the way to measure the edge time duties of the received signal 10 according to the decoding method of the present invention. The decoding method of the present invention is for decoding a received signal 10 to obtain a corresponding decoded bit series. The signal 10 comprises a plurality of adjacent pulses 11. Each pulse 11 is a square pulse, and each pulse 11 comprises a high edge 12 and a low edge 14. Consequently, a high edge time duty is defined as the time length between high edges 12 of two adjacent pulses 11 and a low edge time duty is defined as the time length between low edges 14 of two adjacent pulses 11. Otherwise, Each signal 10 is divided into multiple bit times (B). The time duty of each bit time (B) of the signal 10 is substantially equal to 2T, wherein T is a reference period, and the transmission frequency is ½T.

In the following embodiment, the Miller code is taken as an example to explain the present invention. Each bit time (B) of the Miller code signal 10 corresponds to one bit of 0 or 1; bit 1 represents a signal level transition occurring at a middle portion of the bit time (B), and bit 0 represents a signal level transition occurring at an end portion of the bit time (B).

The Miller code signal 10 comprises a header (S) whose time duty equal to 6T; the header (S) is for being the start of a transmission signal, making the signal receiver be prepared to receive signals. When the start time duty between the high edge of the header and the high edge of the following first bit data is 8T (6T+2T), the indication of the signal start with the following first bit data equal to 0 can be realized; similarly, when the start time duty is 9T (6T+3T), the indication of the signal start with the following first bit data equal to 1 can be realized. Besides, when the start time duty is 8T or 9T, the high edge time duty(H), exclusive of the start time duty, and the low edge time duty (L) of a signal all fall in the range from 4T to 8T. If the edge time duty is less than 4T or larger than 8T during decoding the signal, exclusive of the start time duty, then the present invention takes the signal as noise and does not adopt the result. In the embodiment shown in FIG. 1, the high edge time duty (H) between the high edges 12 of two adjacent pulses 11 is 4T; the low edge time duty (L) between the low edges 14 of two adjacent pulses 11 is 4T.

Referring to FIG. 2A and FIG. 2B, FIG. 2A is a look-up table 42 of the decoding method of the present invention, and FIG. 2B is a look-up table 43 for a detailed description of the look-up table 42 shown in FIG. 2A. In this embodiment, a predetermined look-up table 42 is prepared, wherein the look-up table 42 comprises plural kinds of edge time duties and the corresponding decoded bit combinations thereof. The decoded bit combination is a combination that comprises a plurality of bits 0 or bits 1. FIG. 2A is the embodiment of the look-up table 42, and the first column 44 shows the edge time duty; the second column 48 shows the decoded bit combination with the last bit of the previous decoded bit combination equal to bit 0; the third column 50 shows the decoded bit combination with the last bit of the previous decoded bit combination equal to bit 1.

In the following paragraphs, FIG. 2B is taken to explain the decoded bit combination in detail. The first column 44 in table 43 shows the time interval; the second column 46 shows the possible decoded bit combination corresponded to the edge time duties in the first column 44. For example, when the edge time duty is 5T and the last bit of the previous decoded bit combination is 0, there exist two conditions (2T+3T and 3T+2T). If the condition is 2T+3T, the obtained decoded bit combination is 001; if the condition is 3T+2T, the obtained decoded bit combination is 011. The above-mentioned two decoded bit combinations can be concluded as 0X1, wherein X represents either bit 0 or bit 1. As to other different edge time duties, all can be explained according to this method. Therefore, the look-up table 42 in FIG. 2A can be taken as the conclusion table of table 43.

In the embodiment, the high edge time duty (H) between high edges 12 of the adjacent pulses of signal 10 is measured sequentially, so as to obtain a first time series. Then, the low edge time duty (L) between low edges 14 of the adjacent pulses of signal 10 is measured sequentially, so as to obtain a second time series.

In the embodiment, according to the look-up table 42, the first time series is correspondingly translated to a first decoded series, and the second time series to a second decoded series. Then, a corresponding logic OR operation is performed to the bits of the first and second decoded series, so as to obtain the decoded bit series.

In the embodiment, when the current edge time duty is 4T and the last bit of the previous decoded bit combination is bit 0, the corresponding decoded bit combination outputted from the look-up table is "00", and if the last bit of the previous decoded bit combination is bit 1, then the corresponding decoded bit combination outputted from the look-up table is "11".

When the current edge time duty is 5T and the last bit of the previous decoded bit combination is bit 0, the corresponding decoded bit combination outputted from the look-up table is "0X1". If the last bit of the previous decoded bit combination is bit 1, the corresponding decoded bit combination outputted from the look-up table is "X0", wherein X represents either bit 0 or bit 1.

When the current edge time duty is 6T and the last bit of the previous decoded bit combination is bit 0, then the corresponding decoded bit combination outputted from the look-up table is "010". If the last bit of the previous decoded bit combination is bit 1, the corresponding decoded bit combination outputted from the look-up table is "XX1", wherein X represents either bit 0 or bit 1.

When the current edge time duty is 7T and the last bit of the previous decoded bit combination is bit 0, the corresponding decoded bit combination outputted from the look-up table is "0101" If the last bit of the previous decoded bit combination is bit 1, the corresponding decoded bit combination outputted from the look-up table is "010".

When the current edge time duty is 8T and the last bit of the previous decoded bit combination is bit 1, then the corresponding decoded bit combination outputted from the look-up table is "0101".

In the embodiment, the corresponding decoded bit combination that comprises the value X is replaced by the bit 0. Then, a corresponding logic OR operation is performed to the bit of the first and second decoded series, so as to obtain the decoded bit series.

In the embodiment, the bit 0 does not affect the values of the decoded bit generated from the logic OR operation.

Figure 3:
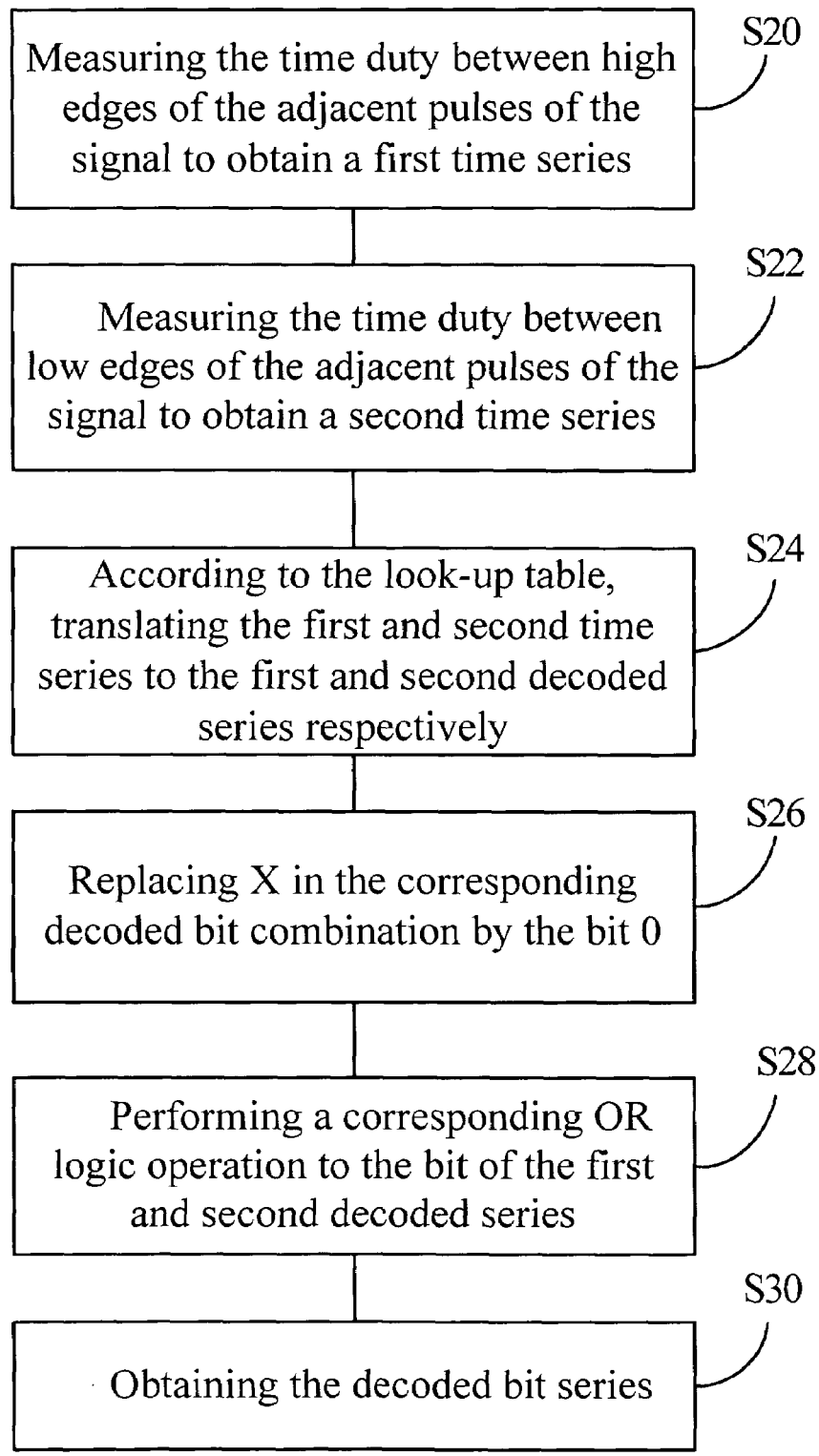
FIG. 3 is a flow chart of the decoding method of the present invention.

Referring to FIG. 3, FIG. 3 is a flow chart of the decoding method of the present invention. The embodiment of the decoding method of the present invention comprises the following steps:

Step S20: measuring the high edge time duty (H) between high edges 12 of adjacent pulses of the signal 10, so as to obtain a first time series;

Step S22: measuring the low edge time duty (L) between low edges 14 of adjacent pulses of the signal 10, so as to obtain a second time series;

Step S24: according to the look-up table 42, translating the first and second time series into a corresponding first and second decoded series respectively;

Step S26: replacing X in the corresponding decoded bit combination by bit 0;

Step S28: performing a corresponding logic OR operation to the first and second decoded series; and Step S30: obtaining the decoded bit series.

Figure 4:
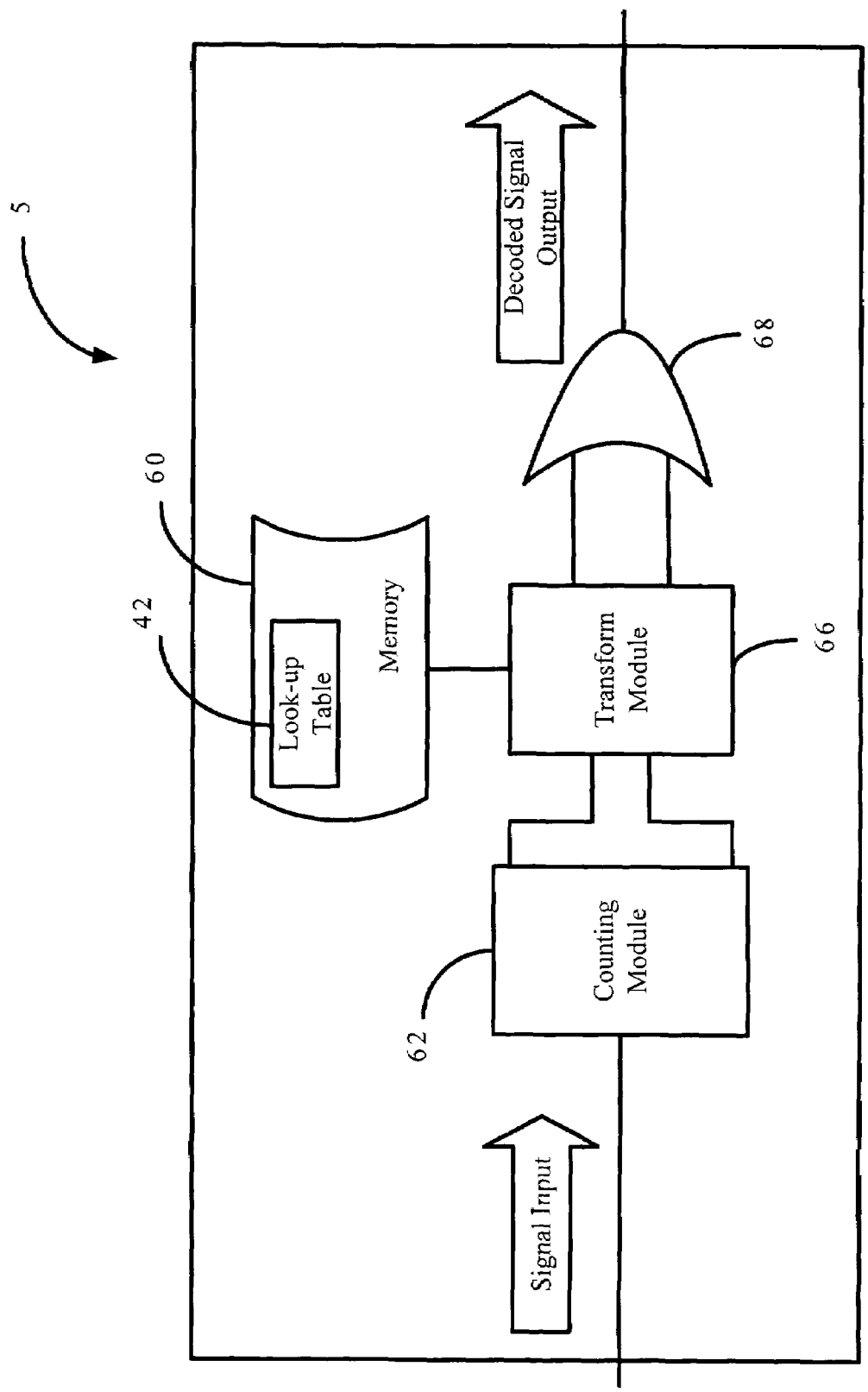
FIG. 4 is a system block diagram of the decoding apparatus of the present invention.

Referring to FIG. 4, FIG. 4 is a system block diagram of the decoding apparatus 5 of the present invention. In another embodiment, the present invention provides a decoding apparatus 5 for decoding a received signal 10 to obtain a corresponding decoded bit series. As to the signal 10, please refer to FIG. 1 and the previous description.

In this embodiment, the decoding apparatus 5 comprises a memory 60, a counting module 62, a transform module 66, and an OR gate module 68.

The memory 60 is for storing a predetermined look-up table 42. The look-up table 42 comprises plural kinds of edge time duties and corresponding decoded bit combinations. The counting module 62 is for sequentially measuring the high edge time duty (H) between high edges 12 of adjacent pulses of the signal 10, so as to obtain a first time series; it also measures the low edge time duty (L) between low edges 14 of adjacent pulses of the signal 10, so as to obtain a second time series. The counting module 62 can be a timer or a counter. The transform module 66 is for translating the first time series to a corresponding first decoded series, and the second time series to a second decoded series according to the look-up table 42 stored in the memory 60. The OR gate module 68 is for performing a corresponding logic OR operation to the first and second decoded series, so as to obtain the decoded bit series.

In this embodiment, the counting module 62, the transform module 66, and the OR gate module 68 can be corresponding computer software programs, or hardware design, or designs that combine software and hardware.

Figure 5:
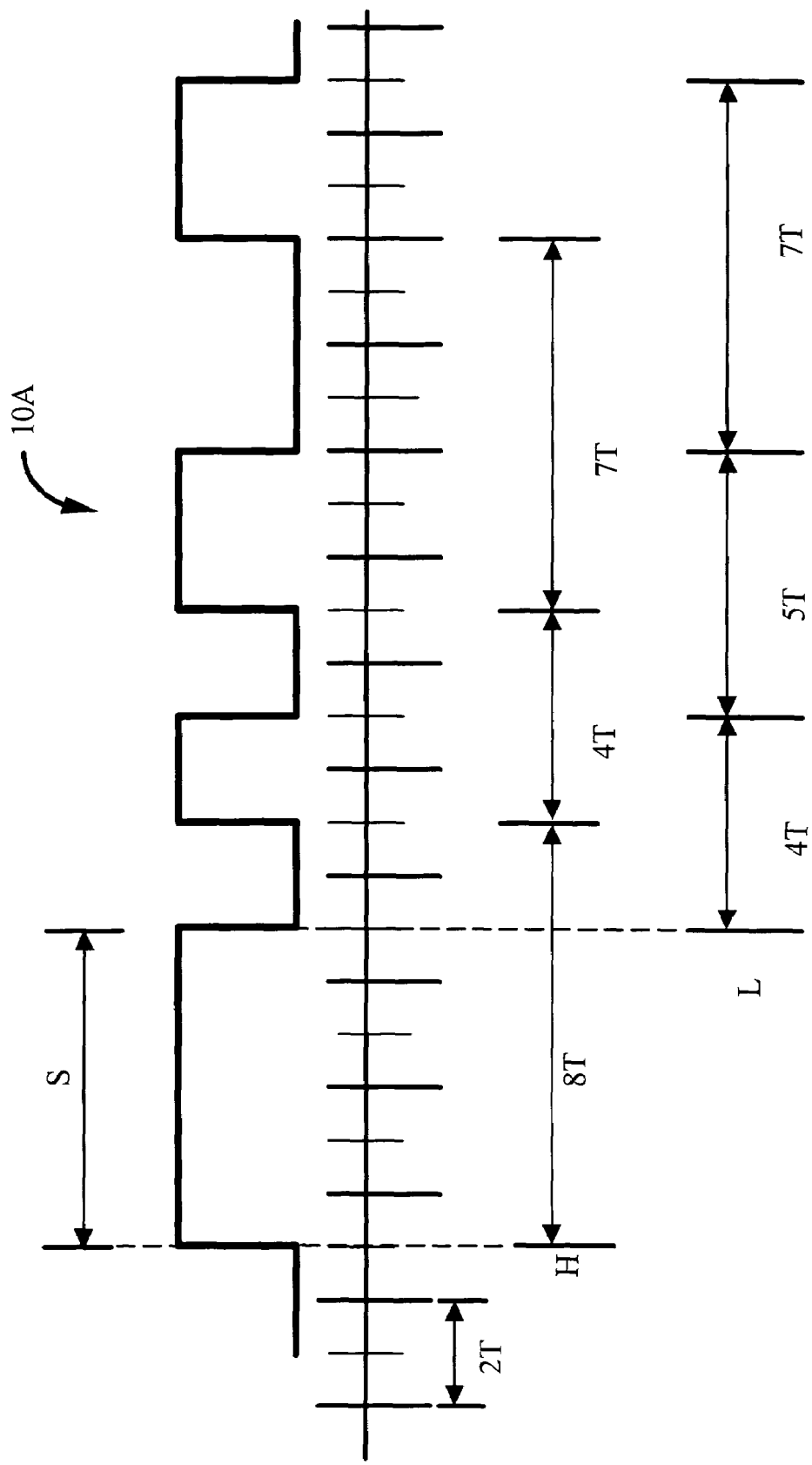
FIG. 5 is a schematic diagram showing the way to decode a signal 10A by the decoding method of the present invention.

Referring to FIG. 5, FIG. 5 is a schematic diagram showing the way to decode a signal 10A by the decoding method or decoder of the present invention. According to the decoding method or decoder of the present invention, since the start time duty between the high edge of the header and the high edge of first bit data is 8T, the first bit data is identified as 0. Consequently, the high edge time duty (H) between the high edges of adjacent pulses of the signal 10A is measured, and the first time series ⌈8T, 4T, 7T, . . . ⌋is obtained; the low edge time duty (L) between the low edges of adjacent pulses of the signal 10A is then measured, and the second time series ⌈4T, 5T, 7T, . . . ⌋is obtained.

According to the look-up table 42, the first time series is translated to the corresponding first decoded series, which is ⌈0, 0 0, 0 1 0 1, . . . ⌋; the second time series is translated to the corresponding second decoded series, which is ⌈0 0, 0 X 1, 0 1 0, . . . ⌋. In the embodiment, the X in the corresponding decoded bit combinations is replaced by the bit 0, and two series ⌈0, 0 0, 0 1 0 1, . . . ⌋and ⌈0 0, 0 0 1, 0 1 0, . . . ⌋are obtained. The logic OR operation is performed to the two series, and one series ⌈0 0 0 0 1 0 1 . . . ⌋is obtained, wherein the series is the corresponding decoded series after decoding the signal 10A. In the embodiment, it is acceptable to directly replace the X values in look-up tables (42 and 43) by the bit 0 and skips the step S26. The meaning of X in the table is that the value must be determined by another decoded series. If the values of the same bit number in two decoded series are both X, this situation occurs due to a few special permutation of bit values, and the X value can be determined according to the previous and next bit values. In the present embodiment, the Miller code is taken as an example to explain the present invention. In this embodiment, when the values of the same bit number in two decoded series are both X, the value should be 0 by determination.

The decoding method of the present invention only needs to measure the edge time duties between the high edges and low edges, select the corresponding decoded series according to the look-up table, and perform simple calculations or determinations; then, the completed decoded bit series can be obtained. Therefore, by the embodiment of the present invention, the computing difficulty is decreased, and the necessary measuring time for decoding is shortened. As to decoding an asymmetric signal, the decoding method of the present invention shows the maximum efficiency.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for decoding a received signal to obtain a decoded bit series, comprising:
   measuring at least one high edge time duty between high edges of the received signal, so as to obtain a first time series;
   measuring at least one low edge time duty between low edges of the received signal, so as to obtain a second time series;
   translating the first time series into a first decoded series;
   translating the second time series into a second decoded series; and
   obtaining the decoded bit series according to the first decoded series and the second decoded series.

2. The method of claim 1, wherein the received signal is a delay modulation signal.

3. The method of claim 1, wherein the received signal is a Miller code.

4. The method of claim 1, wherein the received signal is divided into a plurality of bit times, each bit time corresponds to one bit of 0 or 1, the bit 1 represents a signal level transition occurring at a middle portion of the bit time, and the bit 0 represents a signal level transition occurring at an end portion of the bit time.

5. The method of claim 4, wherein each time duty is substantially equal to a multiple of a reference period T, and each bit time is substantially equal to 2T.

6. The method of claim 5, wherein the received signal comprises a header and at least one bit data, and when the high edge time duty is 8T, the first bit data is assigned the bit 0, and when the high edge time duty is 9T, the first bit data is assigned the bit 1.

7. The method of claim 5, wherein the time duty are all in the range from 4T to 9T.

8. The method of claim 1, further comprising:
   selecting a plurality of decoded bits combinations according to a look-up table related to the high and low edge time duties, so as to separately compose the first and second decoded series.

9. The method of claim 8, wherein the current selected decoded bit combination depends on the last bit of the previous selected decoded bit combination.

10. The method of claim 1, further comprising:
    performing logic operation to the first decoded series and the second decoded series, so as to obtain the decoded bit series.

11. A decoder for decoding a received signal to obtain a decoded bit series, comprising:
    a counting module for measuring the time duties between high edges and low edges of the received signal, so as to obtain a first time series and a second time series; and
    a logic module for translating the first time series into a first decoded series and the second time series into a second decoded series according to a look-up table, and obtaining the decoded bit series according to the first decoded series and the second decoded series.

12. The decoder of claim 11, wherein the decoder is designed as one of the following designs: a software, a hardware, and a design combined a software and a hardware.

13. The decoder of claim 11, wherein the received signal is a delay modulation signal.

14. The decoder of claim 11, wherein the received signal is a Miller code.

15. The decoder of claim 11, wherein the counting module is selected from a timer and a counter.

16. A method for decoding a received signal to obtain a decoded signal, comprising:
    producing a first time series and a second time series according to the received signal;
    translating the first time series and the second time series into a first decoded series and a second decoded series, respectively;
    obtaining the decoded bit series according to the first decoded series and the second decoded series.

17. The method of claim 16, wherein the first time series is corresponding to a rising edge of the received signal and the second time series is corresponding to a falling edge of the received signal.

18. The method of claim 16, wherein the producing step further comprises:
    measuring a first time duty when the received signal is a lower voltage and measuring a second time duty when the received signal is a high voltage; and
    producing the first time series and the second time series according to the first and the second time duties.

19. The method of claim 17, wherein the producing step further comprises:
    measuring a first time duty when the received signal is a lower voltage and measuring a second time duty when the received signal is a high voltage; and
    producing the first time series and the second time series according to the first and the second time duties.

* * * * *